United States Patent [19]

Nussim et al.

[11] 3,910,984

[45] Oct. 7, 1975

[54] BENZYLCYANO-AMIDES

[75] Inventors: Manasse Nussim, Netanya; Ezra Levy, Petah-Tikva; Jacob Naiman, Netanya, all of Israel

[73] Assignee: Plantex, Ltd., Netanya, Israel

[22] Filed: Nov. 27, 1972

[21] Appl. No.: 309,758

[52] U.S. Cl. ................ 260/465 D; 260/256.4 C
[51] Int. Cl.² ........................... C07C 121/75
[58] Field of Search ..................... 260/465 D

[56] References Cited
UNITED STATES PATENTS

| | | | |
|---|---|---|---|
| 3,462,475 | 8/1969 | Strobel et al. | 260/465 |
| 3,671,564 | 6/1972 | Cresswell et al. | 260/465 |
| 3,676,482 | 7/1972 | Hinkley et al. | 260/465 X |

OTHER PUBLICATIONS

Schiemenz et al: Chem. Ber., Vol. 95, pp. 967–970 (1962).

Holmes et al: Can. J. Chem., Vol. 47, pp. 4076–4077 (1969).

Sanchez–Viesca: Chemical Abstracts, Vol. 66, 28475v (1967).

*Primary Examiner*—Lewis Gotts
*Assistant Examiner*—Dolph H. Torrence
*Attorney, Agent, or Firm*—Hubbell, Cohen, and Stiefel

[57] ABSTRACT

Benzylcyano-acids and amides useful as intermediates in the preparation of pharmaceutically valuable 2,4-diamino-5-benzyl pyrimidines.

1 Claim, No Drawings

BENZYLCYANO-AMIDES

The present invention relates to benzylcyano-acids and amides of general formula I

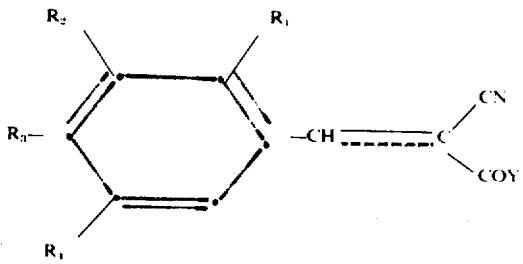

wherein $R_1$ and $R_2$ are each selected from among the group consisting of hydrogen, halogen, lower alkyl and lower alkoxy, $R_3$ and $R_4$ are each a lower alkoxy group, Y is selected from the group consisting of hydroxy, and an unsubstituted or alkyl-substituted amino group and the dotted line designates either an additional C—C bond or hydrogen atoms, excluding α-cyano-3,4,5-trimethoxy-cinnamic acid.

The compounds of formula I are valuable intermediates in a process for the preparation of certain 2,4-diamino-5-benzyl-6-hydroxy-pyrimidines which in turn are easily transformed to pharmaceutically valuable 2,4-diamino-5-benzyl pyrimidines as described in our co-pending Application No. 309,757 filed concurrently herewith.

This application also discloses a process for the preparation of compounds of general formula I wherein:

a. an aldehyde of general formula II

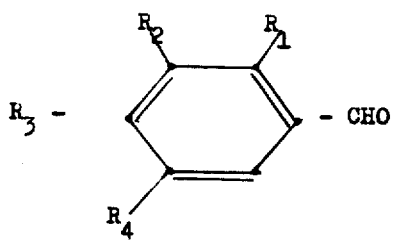

in which $R_1$, $R_2$, $R_3$, and $R_4$, are as defined above is reacted in the presence of a suitable basic catalyst with a compound of general formula III

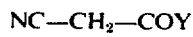

NC—CH$_2$—COY in which Y is as defined above to yield a compound of general formula IV

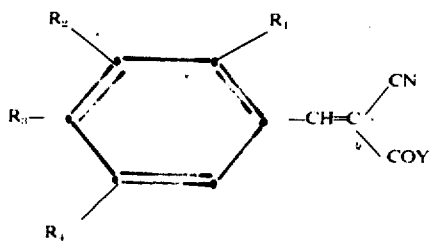

in which $R_1$, $R_2$, $R_3$ $R_4$ and Y are as defined above; and, if desired.

b. the compound of general formula IV is hydrogenated catalytically with a suitable catalyst in a suitable inert solvent to yield the desired compound of general formula V

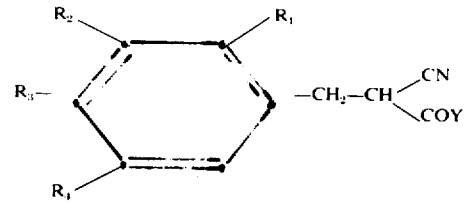

in which $R_1$, $R_2$, $R_3$, $R_4$ and Y are as defined above. The basic catalyst used in the first reaction step is preferably a secondary amine e.g., piperidine, a metal alkoxide or sodium or potassium hydroxide. This step is performed in an inert solvent such as an alcohol e.g., methanol, ethanol, isopropanol; ethers, e.g., dioxane, tetrahydrofuran; pyridine water. Said step is preferably performed at elevated temperatures, e.g. between 40°–80°. (All temperatures indicated herein are in degrees centigrade).

As preferred catalysts for the hydrogenation step there may be mentioned, e.g. palladized or platinized charcoal. As suitable solvents there may be mentioned ethyl acetate; alcohols, e.g. methanol, ethanol, isopropanol. ethers, e.g. dioxane; etc.

The present invention also relates to a process for the preparation of 2,4-diamino-5-benzyl-6-hydroxy-pyrimidines in which a compound of general formula V is, without a solvent or in the presence of a suitable solvent, reacted with guanidine to yield a compound of general formula VI

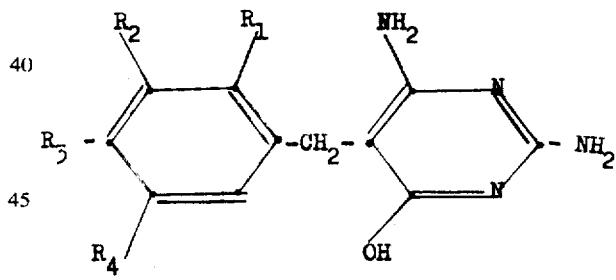

in which $R_1$, $R_2$, $R_3$ and $R_4$ are as defined above.

The condensation with guanidine, when being performed in an inert solvent, is performed preferably in an alcohol such as methanol, ethanol, isopropanol, etc.

The invention will now be illustrated with reference to the following examples without, however, being limited thereto.

EXAMPLE 1

A mixture of 100 g of 3,4,5-trimethoxy-benzaldehyde and 43.5g of cyanoacetic acid in 1 liter of water containing 21 g of sodium hydroxide was stirred for 2 hours at 50°. The clear solution that was thereby obtained was cooled, 120 cc of 5 N hydrochloric acid were added and after additional cooling resulting the precipitate was filtered off and washed with 200 cc of water. The crude material was dried at 80° and used in the hydrogenation step without further purification. It melted at 221°–224°. The yield of α-cyano-3,4,5-trimethoxy-cinnamic acid was 126 g (94%).

EXAMPLE 2

100 g of α-cyano-3,4,5-trimethoxy-cinnamic acid obtained as in Example 1 were dissolved in a solution of 16 g of sodium hydroxide in 1 liter of water and then 7.5 g of 5% of palladized charcoal were added. The mixture was hydrogenated at atmospheric pressure until the absorption of hydrogen had stopped. The catalyst was removed and 175 cc of 10% hydrochloric acid were added. The resulting precipitate was filtered off, washed with 200 cc of water and dried in vacuo at 50° for 10 hours to yield 93.1 g (93%) of α-cyano-3,4,5,-trimethoxy -dihydrocinnamic acid; m.p. 102°–105°. A pure sample, recrystallized from chloroform melted at 104°–105°.

EXAMPLE 3

100 g of 3,4,5-trimethoxy-benzaldehyde and 44 g of α-cyano-acetamide were dissolved in 300 cc of dry pyridine at 50°. To this solution 10 cc of piperidine were added and the mixture was heated at 50° with stirring for 2 hours. The reaction mixture was cooled at room temperature, filtered off and the precipitate was washed on the filter with 50 cc of cold isopropanol. The product was dried at 80° to yield 123.6g(92.5%) of α-cyano-3,4,5-trimethoxy-cinnamamide; m.p. 192°–194°. This product was used for the hydrogenation step without further purification. A pure sample, recrystallized from isopropanol, melted at 193°–195°.

EXAMPLE 4

100 g of α-cyano-3,4,5-trimethoxy-cinnamamide obtained as in Example 3 were dissolved in 1 liter of a 9:1 mixture of dioxane-water and 7.5 g of 5% of palladized charcoal were added. The mixture was hydrogenated at atmospheric pressure until the absorption of hydrogen had stopped. The catalyst was removed and the solvent was evaporated under vacuum. The residue was crystallized from ethyl acetate to obtain, after drying at 60° for 6 hours, 89.2 g (89%) of α-cyano- 3,4,5-trimethoxy-dihydrocinnamamide; m.p. 128°–130°.

EXAMPLE 5

To a solution of 23 g of sodium in 1 liter of dry methanol, 90 g of guanidine carbonate were added and the mixture was stirred for 15 minutes at room temperature. The precipitated sodium carbonate was filtered off with suction over cellite and the solids were washed with 200 cc of methanol. To this guanidine solution in methanol were added 132 g of α-cyano-3, 4,5-trimethoxy-dihydrocinnamamide prepared as described in example 4. The solution was refluxed for 6 hours and the methanol was distilled off in vacuo. The residue was dissolved in 300 cc of water and the product precipitated by the addition of 6N hydrochloric acid to pH 6. After allowing the product to cool at 0° for 2 hours the white solid was filtered off and washed with 40 cc of ice-cold water. The product was dried at 80°/5mm for 12 hours to yield 136.5 g (89%) of colorless 2,4-diamino-5-(3', 4', 5'-trimethoxy-benzyl) -6-hydroxy-pyrimidine; m.p. 275°–276°.

EXAMPLE 6

A mixture of 100 g of α-cyano-3,4,5-trimethoxy-dihydrocinnamamide and 60 g of freshly prepared guanidine was heated at 110° for 1 hour with occasional stirring. The reaction mixture was dissolved in 75 cc of hot water and the solution was filtered. The product was precipitated by adding to the clear filtrate, 6N hydrochloric acid to pH 6. After allowing to cool at 0° for 4 hours, the solid was filtered off and washed with 30 cc of ice-cold water. The product was dried at 80°/5mm for 12 hours to obtain 106.7 g (92%) of a compound (m.p. 274°–276°), which was identical with the compound obtained in example 5.

EXAMPLE 7

This example was carried out exactly as described in example 3 except that 84.7 g of 3,4-dimethoxybenzaldehyde were used in place of the trimethoxybenzaldehyde. The product was dried at 80° to obtain 111.2 g (94%) of α-cyano -3', 4', -dimethoxy-cinnamamide; m.p. 182°–185°. This product was used for the hydrogenation step without further purification. A pure sample, recrystallized from dimethyl formamide had a m.p. of 184°–185°.

EXAMPLE 8.

The hydrogenation of 100 g of α-cyano -3,4-dimethoxy-cinnamamide was carried out as described in Example 4. Crystallization of the product from dry ethanol yielded 90 g (90%) of α-cyano- 3,4-dimethoxy-dihydrocinnamamide; m.p. 170°–171°.

EXAMPLE 9

This example was run exactly as described in example 5 except that 50 g of the product of Example 8, 10 g of sodium and 38.5 g. of guanidine carbonate in 0.5 liter of dry methanol were used. The crystalline product 2,4 diamino - 5- (3'4'-dimethoxybenzyl) -6-hydroxy-pyrimidine, m.p. 268°–270° weighed 52 g (87.5%)

EXAMPLE 10

This example was carried out exactly as described in Example 6, except that 100 g of the product of example 8 and 70 g of freshly prepared guanidine were used. The product obtained 2,4-diamino -5- (3',4'-dimethoxybenzyl)-6-hydroxy pyrimidine m.p. 268°–270° weighed 108 g. (91%).

We claim:

1. α-cyano-3,4,5-trimethoxy-dihydrocinnamamide.

* * * * *

PO-1050
(5/69)

UNITED STATES PATENT OFFICE
CERTIFICATE OF CORRECTION

Patent No. 3,910,984            Dated October 7, 1975

Inventor(s) MANASSE NUSSIM et al

It is certified that error appears in the above-identified patent and that said Letters Patent are hereby corrected as shown below:

Column 2, line 65: "resulting the" should read -- the resulting --.

Signed and Sealed this third Day of February 1976

[SEAL]

Attest:

RUTH C. MASON
*Attesting Officer*

C. MARSHALL DANN
*Commissioner of Patents and Trademarks*